US012607154B2

(12) United States Patent
Berger et al.

(10) Patent No.: US 12,607,154 B2
(45) Date of Patent: Apr. 21, 2026

(54) COKE SCRAPING RING, CYLINDER LINER, CYLINDER, GAS ENGINE AND GAS ENGINE OPERATION METHOD

(71) Applicant: Caterpillar Energy Solutions GmbH, Mannheim (DE)

(72) Inventors: Olaf Berger, Dudenhofen (DE); Florian Kahl, Speyer (DE); Felix Kiefer, Mannheim (DE); Inigo Guisasola, Landau (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/703,217

(22) PCT Filed: Nov. 11, 2022

(86) PCT No.: PCT/EP2022/025507
§ 371 (c)(1),
(2) Date: Apr. 19, 2024

(87) PCT Pub. No.: WO2023/088580
PCT Pub. Date: May 25, 2023

(65) Prior Publication Data
US 2025/0230778 A1      Jul. 17, 2025

(30) Foreign Application Priority Data

Nov. 16, 2021    (GB) ..................................... 2116475

(51) Int. Cl.
*F02F 1/00*        (2006.01)
*F16J 9/12*        (2006.01)
(52) U.S. Cl.
CPC ................. *F02F 1/004* (2013.01); *F16J 9/12* (2013.01); *F02F 2001/006* (2013.01)

(58) Field of Classification Search
CPC ........ F02F 1/004; F02F 1/00; F02F 2001/006; F16J 9/12; F16J 10/04
See application file for complete search history.

(56) References Cited

U.S. PATENT DOCUMENTS 2,148,764 A      2/1939   Hans
3,476,099 A      11/1969  Packard et al.
(Continued)

FOREIGN PATENT DOCUMENTS

CN      105041470 A    11/2015
DE      10121852 A1    11/2002
(Continued)

OTHER PUBLICATIONS

International Search Report related to Application No. PCT/EP2022/025507; reported on Jan. 27, 2023.
(Continued)

*Primary Examiner* — Grant Moubry

(57)        ABSTRACT

The present invention pertains to a coke scraping ring for a cylinder liner of a cylinder used in a gas engine, for scraping carbonaceous residuals (R) off a top land of a piston, comprising a ring body, a top end, a bottom end, and a combustion-facing side configured to be in direct contact with combustion products during operation. The coke scraping ring further comprises a scraping ring section at the bottom end and a recess ring section, configured to provide a recess in the combustion-facing side. The present invention further pertains to a cylinder liner comprising such scraping ring, to a cylinder comprising such cylinder liner, to a gas engine comprising such cylinder and to a gas engine operation method comprising continuous scraping carbonaceous residuals off a top land of a cylinder piston, comprising the steps of assembling a cylinder piston, a coke scraping ring, a cylinder liner, a cylinder crank case and a cylinder head to obtain a ready-to-operate cylinder, operating the (Continued)

cylinder while scraping excess carbonaceous residuals off
the top land of a cylinder piston, and observing no pressure-
induced deformation on the cylinder piston.

14 Claims, 8 Drawing Sheets

(56) References Cited

U.S. PATENT DOCUMENTS

| | | | |
|---|---|---|---|
| 7,739,993 B2 | 6/2010 | Salzgeber et al. | |
| 10,125,869 B2 * | 11/2018 | Jenness ..................... | F16J 9/062 |
| 2010/0319661 A1 * | 12/2010 | Klyza ..................... | F02B 75/28 |
| | | | 92/158 |
| 2015/0354495 A1 | 12/2015 | Donahue | |
| 2017/0002734 A1 * | 1/2017 | Watanabe ................. | F02F 1/20 |
| 2017/0009888 A1 * | 1/2017 | Pegg ..................... | F04B 39/126 |
| 2020/0300195 A1 * | 9/2020 | Cheng ...................... | F02F 3/28 |

FOREIGN PATENT DOCUMENTS

| | | | |
|---|---|---|---|
| DE | 102016003004 A1 | 9/2017 | |
| EP | 0837982 B1 * | 1/1999 | .............. F02B 77/04 |
| EP | 1679434 A1 | 7/2006 | |
| EP | 3192994 A2 | 7/2017 | |
| WO | 2019118196 A1 | 6/2019 | |
| WO | 2021126509 A1 | 6/2021 | |

OTHER PUBLICATIONS

Great Britain Search Report related to Application No. 2116475.1;
reported on Apr. 8, 2022.

* cited by examiner

COKE SCRAPING RING, CYLINDER LINER, CYLINDER, GAS ENGINE AND GAS ENGINE OPERATION METHOD

CROSS-REFERENCE TO RELATED APPLICATION

This Application is a 35 USC § 371 US National Stage filing of International Application No. PCT/EP2022/025507 filed on Nov. 11, 2022 which claims priority under the Paris Convention to Great Britain Patent Application No. 2116475.1 filed on Nov. 16, 2021.

TECHNICAL FIELD

The present invention pertains to a coke scraping ring for a cylinder liner of a cylinder used in a gas engine, for scraping carbonaceous residuals off a top land of a piston, comprising a ring body, a top end, a bottom end, and a combustion-facing side configured to be in direct contact with combustion products during operation. The present invention also relates to a cylinder liner comprising such coke scraping ring. Further, the present invention also relates to a cylinder comprising such a cylinder liner, to a gas engine comprising such a cylinder and to a gas engine operation method.

Technological Background

During operation of a gas engine, carbonaceous deposits stemming from additives provided in lubricant oil or the combustion process itself tend to accumulate on inner surfaces of the combustion chamber. One major surface area affected by such carbonaceous deposits is the top land of the cylinder piston. Carbonaceous residuals deposited on the top land polish the cylinder liner during cylinder operation, which can be detrimental to engine performance and cylinder lifespan.

To avoid such cylinder liner polishing, an anti-polishing ring, or coke scraping ring, may be introduced into the cylinder, serving as placeholder between the cylinder liner and the adjacent piston. When the cylinder piston passes stationary coke scraping ring, all carbonaceous residuals reaching beyond the clearance between cylinder piston and the inner surface of the coke scraping ring are scraped off by the coke scraping ring.

Known coke scraping rings are usually designed to have a surface running parallel to the piston, to reduce dead space to a minimum. DE 10 2016 003 004 A1 for example suggests using a coke scraping ring with an inner surface, facing the combustion chamber of the cylinder, which is aligned such that it runs parallel to the piston.

An inherent downside of utilizing coke scraping rings known from the state of the art is that the pressure within the clearance between the cylinder piston and the coke scraping ring is choked drastically due to the small gap provided. At the same time, increasing the clearance leads to an increase of dead space, meaning volume in which no combustion occurs.

The highest pressure in the combustion chamber is expected when the piston is in the top dead center area during ignition. The pressure wave of ignition propagates into the piston cavity and inflicts stresses into the piston via the piston cavity. As a result, the fatigue strength of the piston can be reduced. Such pressure-induced damages can deform the piston and can lead to gas engine malfunction or to costly repairs.

The coke scraping ring, the cylinder liner, the cylinder, the gas engine and the gas engine operation method of the present disclosure solve one or more problems set forth above.

SUMMARY OF THE INVENTION

Starting from the prior art, it is an objective to provide a simple, cost-effective coke scraping ring allowing an efficient scraping of carbonaceous residuals while providing a more homogeneous pressure distribution to prevent piston damage.

This objective is solved by means of a coke scraping ring with the features claimed, a cylinder liner with the features claimed, a cylinder with the features claimed and a gas engine with the features claimed. Preferred embodiments are set forth in the present specification, the Figures as well as the dependent claims.

Accordingly, a coke scraping ring for a cylinder liner of a cylinder used in a gas engine, for scraping carbonaceous residuals off a top land of a piston, is provided, comprising a ring body, a top end, a bottom end, and a combustion-facing side configured to be in direct contact with combustion products during operation. The coke scraping ring further comprises a scraping ring section at the bottom end and a recess ring section, configured to provide a recess in the combustion-facing side.

Further, a cylinder liner is provided, comprising such coke scraping ring.

Additionally, a cylinder is provided, comprising such a cylinder liner.

Further, a gas engine is provided, comprising such a cylinder.

Finally, a gas engine operation method is provided, comprising continuous scraping carbonaceous residuals off a top land of a cylinder piston. The method comprises the steps of assembling a cylinder piston, a coke scraping ring according to the present disclosure, a cylinder liner, a cylinder crank case and a cylinder head to obtain a ready-to-operate cylinder, operating the cylinder while scraping excess carbonaceous residuals off the top land of a cylinder piston, and observing no pressure-induced deformation on the cylinder piston.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
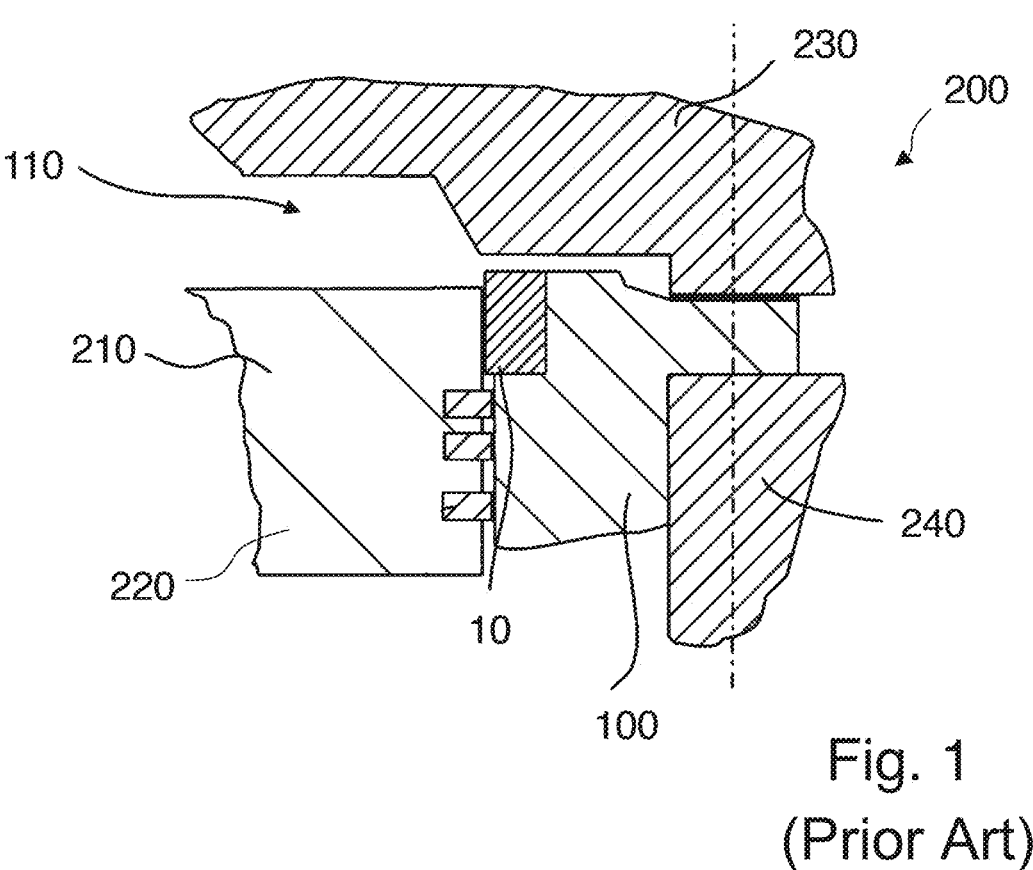
FIG. 1 schematically illustrates a cross-section of a cylinder according to an embodiment of the state of the art.

In the following, the invention will be explained in more detail with reference to the accompanying figures. In the Figures, like elements are denoted by identical reference numerals and repeated description thereof may be omitted in order to avoid redundancies.

The coke scraping rings shown in the figures may be illustrated as half, quarter, or other partial component views for the purpose of illustrating the rings cross-section and other parts of the ring. However, all illustrations relate to embodiments showing a full ring structure.

The present disclosure is directed to a coke scraping ring, suitable to scrape coke, in the following also called carbonaceous residuals, off a top land of a cylinder piston.

In FIG. 1, a cross-section of a cylinder 200 according to an embodiment of the state of the art is shown in an assembled state. A cylinder 200 comprises a cylinder liner 100 having a coke scraping ring 10 protruding inwardly from the cylinder liner 100 towards the combustion chamber 110. The coke scraping ring 10 is arranged adjacent to a top land 210 of a piston 220 such that a clearance is formed. The clearance is very narrow to allow efficient scraping off carbonaceous residuals deposited on the top land 210 of the piston 220.

During operation of the cylinder 200, gas is combusted, and gas pressure builds up the combustion chamber 110. However, the pressure in the clearance between the cylinder piston and the coke scraping ring is choked drastically due to the small gap provided. At the same token, gas inside the small clearance does not combust and is therefore dead space.

More specifically, the pressure in the combustion chamber 110 can be so much higher compared to the pressure in said clearance, that the top land 210 are of the cylinder piston 220 is widened, deformed, or weakened.

Figure 2:
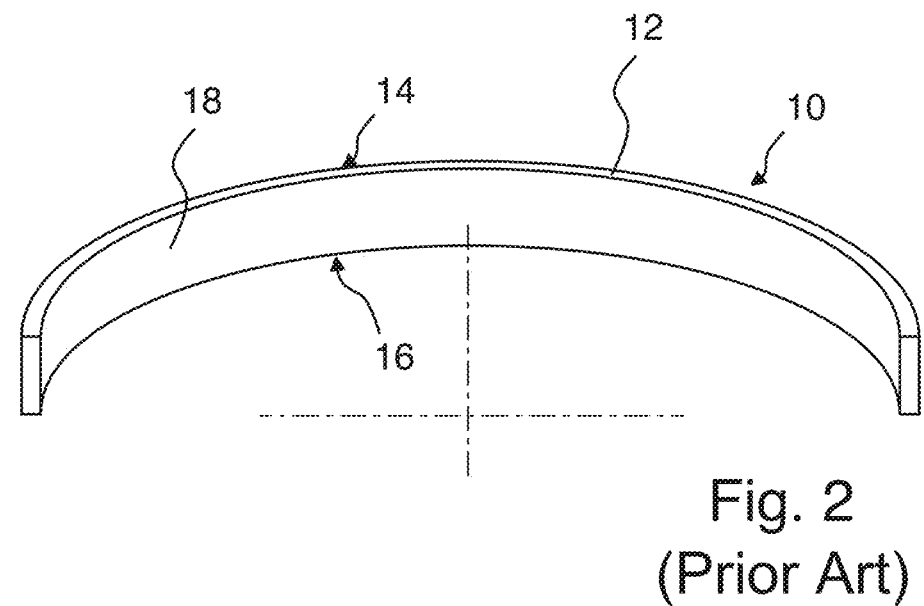
FIG. 2 schematically illustrates a cross-section of a coke scraping ring according to an embodiment of the state of the art in a perspective view.

FIG. 2 schematically illustrates one half of the coke scraping ring 10 of FIG. 1, known from the state of the art, in a perspective view. The coke scraping ring 10 known from the state of the art comprises a ring body 12, a top end 14, a bottom end 16, and a combustion-facing side 18 configured to be in direct contact with the combustion products during operation. The combustion-facing side 18 is configured to run parallel to a surface of an adjacent cylinder piston.

Figure 3:
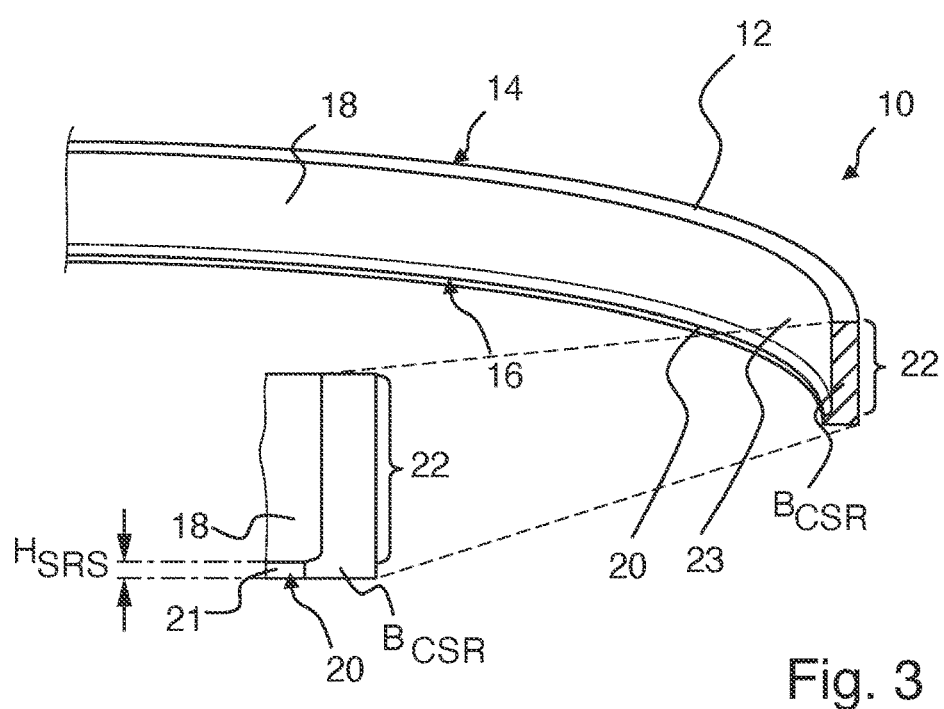
FIG. 3 schematically illustrates a cross-section of a coke scraping ring according to an embodiment in a perspective view.

FIG. 3 illustrates a coke scraping ring 10 according to a first embodiment of the present disclosure in a perspective view together with an additional magnification of the coke scraping ring 10 according to this embodiment.

The coke scraping ring 10 comprises a ring body 12, a top end 14, a bottom end 16, and a combustion-facing side 18 configured to be in direct contact with combustion products during operation. The coke scraping ring 10 further comprises a scraping ring section 20 at the bottom end 16 and a recess ring section 22, configured to provide a recess 23 in the combustion-facing side 18.

According to the embodiment shown in FIG. 3, the recess 23 of the recess ring section 22 may extend along the entire circumference of the combustion-facing side 18. Thereby, the coke scraping ring 10 may be mounted to a cylinder liner and/or to a cylinder in any orientation along its rotational axis.

As shown in the magnification of FIG. 3, the recess ring section 22 may extend to the top end 14, such that a coke scraping ring cross-section $B_{CSR}$ is L-shaped. Thereby, a widened fluid path between a combustion chamber (not shown) and the scraping ring section 20 is provided. This has the advantage that choking is reduced by the recess 23 of the recess ring section 22.

In an extreme case, if the clearance is large enough, combustion may occur also in the recess 23 of the recess ring section 22, with the effect that an overpressure in the combustion chamber is reduced or avoided. In addition, no dead space is added to a combustion chamber by the recess 23 in this case.

The scraping ring section 20 may further comprise a scraping surface 21 running parallel to an adjacent piston cylinder (not shown in FIG. 3). Further, the height $H_{SRS}$ of the scraping ring section 20 may be between 1 and 1.5 mm. The coke scraping ring 10 may comprise cast iron and/or steel. Further, the coke scraping ring 10 may be provided as one piece.

The height of the recess ring section 22 may extend over 90% of a total height of the coke scraping ring.

Figure 4:
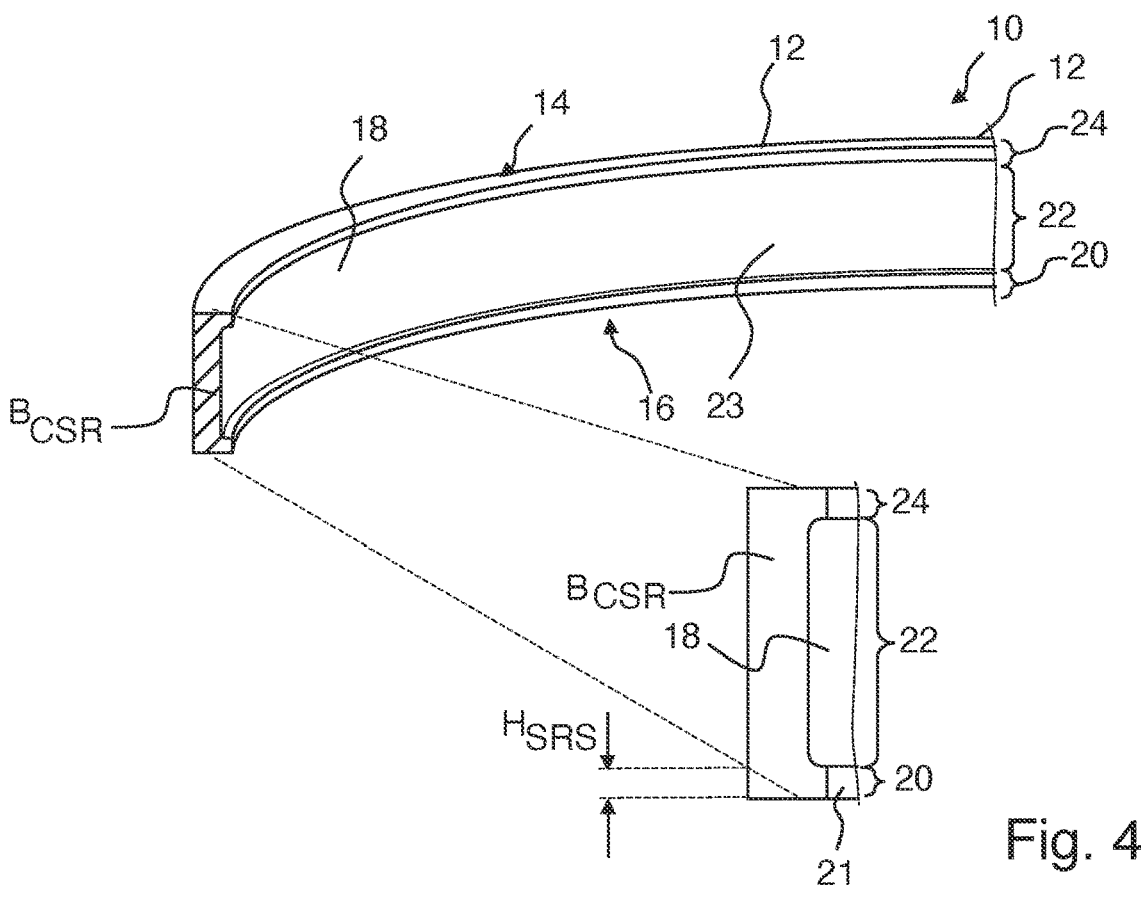
FIG. 4 schematically illustrates a cross-section of a coke scraping ring according to another embodiment in a perspective view.

FIG. 4 illustrates a coke scraping ring 10 according to another embodiment in a perspective view together with an additional magnification of the coke scraping ring 10 according to this embodiment. Where applicable, the same explanations provided in the embodiments shown in FIG. 3 also apply to the embodiment shown in FIG. 4.

The coke scraping ring 10 according to this embodiment also comprises a ring body 12, a top end 14, a bottom end 16, and a combustion-facing side 18 configured to be in direct contact with combustion products during operation. The coke scraping ring 10 further also comprises a scraping ring section 20 at the bottom end 16 and a recess ring section 22, configured to provide a recess 23 in the combustion-facing side 18.

According to the embodiment shown in FIG. 4, the recess ring section 22 may extend along the entire circumference of the combustion-facing side 18. Further, the recess 23 of the recess ring section 22 may extend between the scraping ring section 20 at the bottom end 12 and a further scraping ring section 24 at the top end 14, such that a coke scraping ring cross-section is C-shaped. Thereby, the coke scraping ring 10 can be provided symmetrically and may thus be mounted in any orientation.

The recess ring section may extend over 80% of a total height of the coke scraping ring. Also, the scraping ring section 20 and the further combustion ring section 24 each contribute to about 10% of the total height of the coke scraping ring. Thereby, dead space in the combustion chamber can be reduced, while still providing a widened fluid path between a combustion chamber (not shown) and the scraping ring section 20. This has the advantage that an overpressure in the combustion chamber is reduced or avoided.

The scraping ring section 20 may further comprise a scraping surface 21 running parallel to an adjacent cylinder piston (not shown in FIG. 4). The height $H_{SRS}$ of the scraping ring section 20 and/or the height of the further scraping ring section 24 may be between 1 and 1.5 mm. Thereby, the scraping surface 21 can be fitted to the piston as close as possible, at a minimum of dead space. The coke scraping ring 10 may comprise cast iron and/or steel. Further, the coke scraping ring 10 may be provided as one piece.

Figure 5:
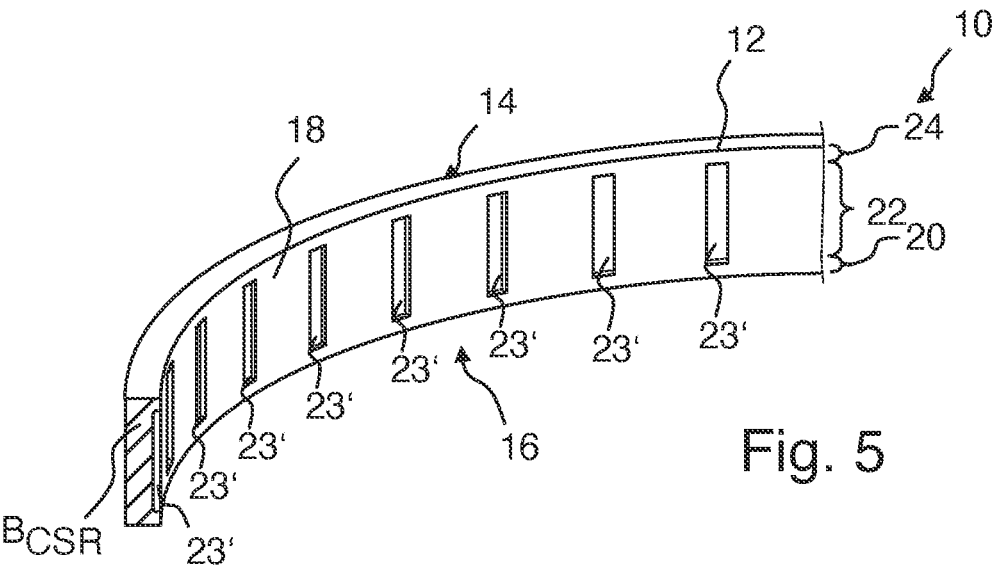
FIG. 5 schematically illustrates a cross-section of a coke scraping ring according to another embodiment in a perspective view.

FIG. 5 shows a coke scraping ring 10 according to a further embodiment in a sectional, perspective view. Where applicable, the same explanations provided in the embodiments shown in FIGS. 3 and 4 also apply to the embodiment shown in FIG. 5. The coke scraping ring 10 according to this embodiment also comprises a ring body 12, a top end 14, a bottom end 16, and a combustion-facing side 18 configured to be in direct contact with combustion products during operation. The coke scraping ring 10 further also comprises a scraping ring section 20 at the bottom end 16 and a recess ring section 22, configured to provide a recess 23 in the combustion-facing side 18.

According to the embodiment shown in FIG. 5, the recess 23 of the recess ring section 22 may comprise several recess elements 23' provided on the combustion-facing side 18. The recess elements 23' may be distributed evenly across the combustion-facing side 18 and may only partly protrude into the ring body 12. The recess elements may each comprise a cross-section in the shape of a rectangle.

In general, providing several recess elements 23' has the advantage that the dead space, created by the recess ring section 22 is reduced, while at the same time, the recess elements 23' provide a widened flow path between a combustion chamber (not shown) and the scraping ring section 20. This has the advantage that choking is reduced by the recess elements 23' of the recess ring section 22, with the effect that a more homogeneous pressure distribution is obtained. This eases fatigue strength reduction in the cylinder piston.

The recess elements 23' may further be oriented in a vertical configuration. The embodiment shown in FIG. 5 may further comprise a further scraping ring section 24 at the top end 14. Thereby, a symmetrical coke scraping ring 10 is achieved, which can be mounted in any orientation, thereby minimizing the risk of errors during assembly.

The recess ring section may extend over 80% of a total height of the coke scraping ring. Thereby, dead space in the combustion chamber can be reduced, while still providing a widened flow path between a combustion chamber (not shown) and the scraping ring section 20. This has the advantage that an overpressure in the combustion chamber is reduced or avoided.

In the shown embodiment, the scraping ring section 20 and the further combustion ring section 24 may each contribute to about 10% of the total height of the coke scraping ring.

Figure 6:
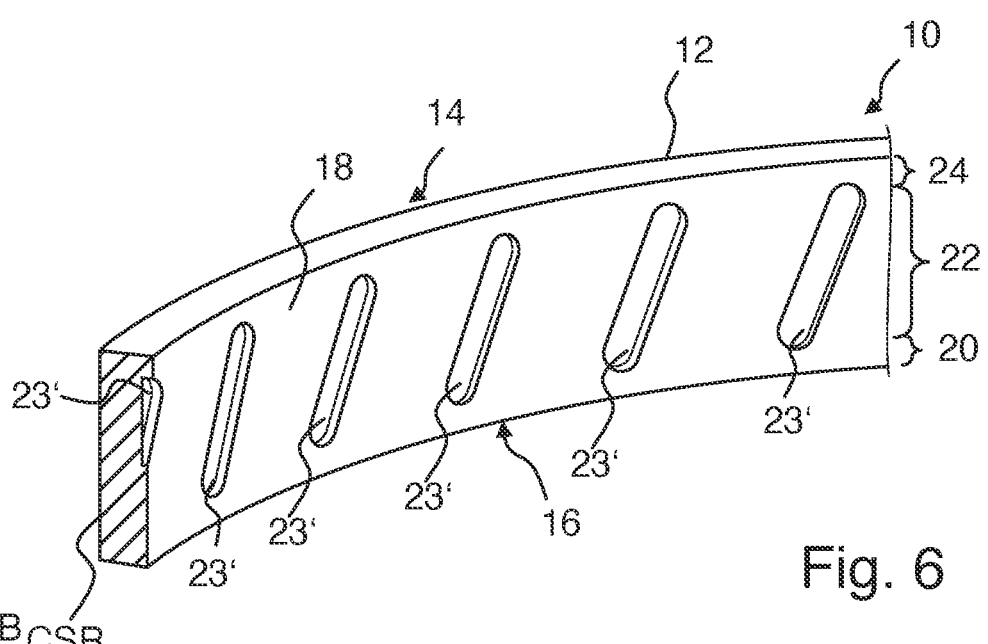
FIG. 6 schematically illustrates a cross-section of a coke scraping ring according to another embodiment in a perspective view.

FIG. 6 shows a coke scraping ring 10 in an embodiment based on the embodiment shown in FIG. 5. Where applicable, the same explanations provided in the embodiments shown in FIGS. 3-5 also apply to the embodiment shown in FIG. 6. The embodiment shown differs from the embodiment shown in FIG. 5, in that the recess elements 23' have a rounded rectangular cross-section, wherein the recess elements 23' are oriented in a parallel and tilted configuration.

Providing the recess elements 23' in a parallel and tilted configuration has the advantage that a swirl may be created by the recess elements.

Since knocking events often come from the wall area of the cylinder wall, an increased swirl at this position can have a positive effect on the knock limit. The direction of the recess elements 23' can be in the main twist direction or against it.

Figure 7:
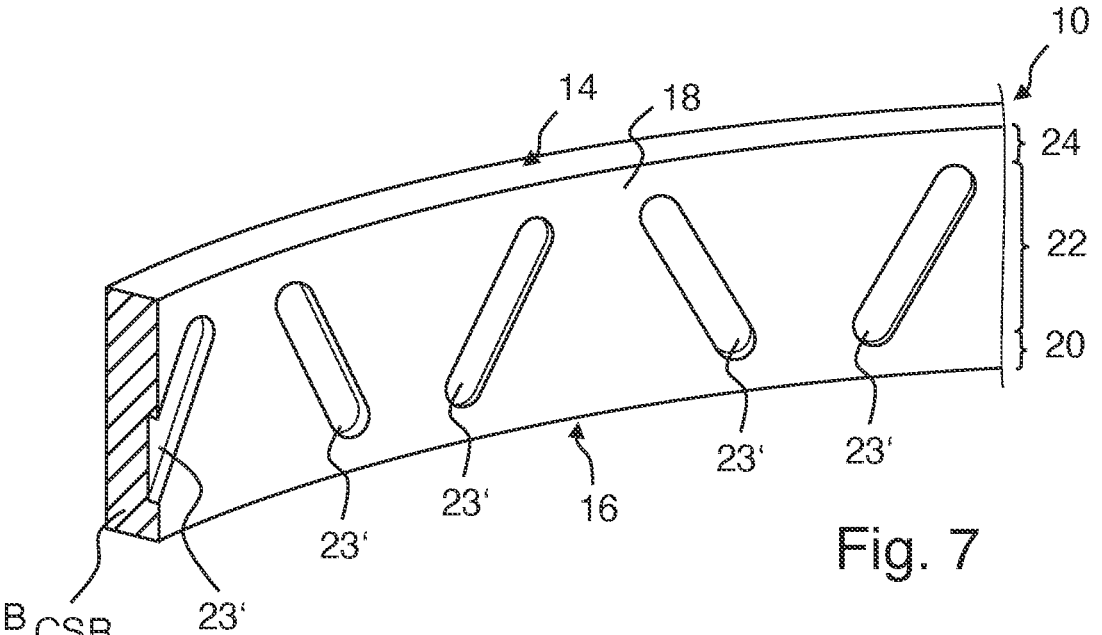
FIG. 7 schematically illustrates a cross-section of a coke scraping ring according to another embodiment in a perspective view.

FIG. 7 shows a coke scraping ring 10 in an embodiment similar to the embodiment shown in FIG. 6. Where applicable, the same explanations provided in the embodiments shown in FIGS. 3-6 also apply to the embodiment shown in FIG. 7. The embodiment shown differs from the embodiment shown in FIG. 6 in that the recess elements 23' are oriented in a zig-zag configuration.

Providing the recess elements 23' in a zig-zag configuration has the advantage that the coke scraping ring 10 has a symmetric design, allowing installation thereof in both orientations of the coke scraping ring. Thereby, installation is simplified, and the risk of mounting mistakes can be reduced.

Figure 8:
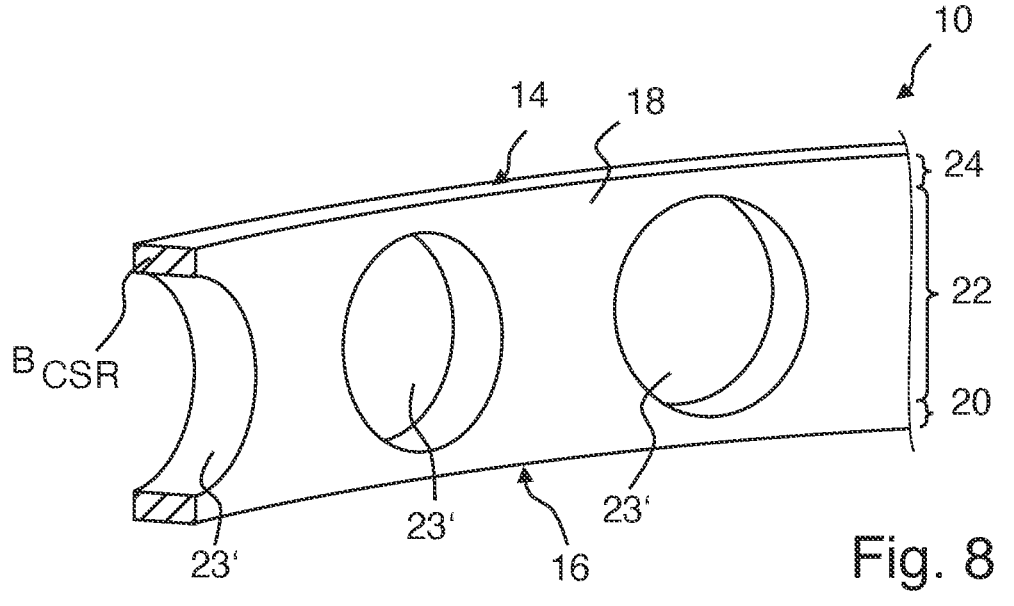
FIG. 8 schematically illustrates a cross-section of a coke scraping ring according to another embodiment in a perspective view.

FIG. 8 shows a coke scraping ring 10 in an embodiment based on the embodiment shown in FIG. 5. Where applicable, the same explanations provided in the embodiments shown in FIGS. 3-7 also apply to the embodiment shown in FIG. 8. The embodiment shown differs from the embodiment shown in FIG. 5, in that the recess elements 23' fully protrude into the ring body 12, and wherein the recess elements 23' each have a circular cross-section.

Figure 9:
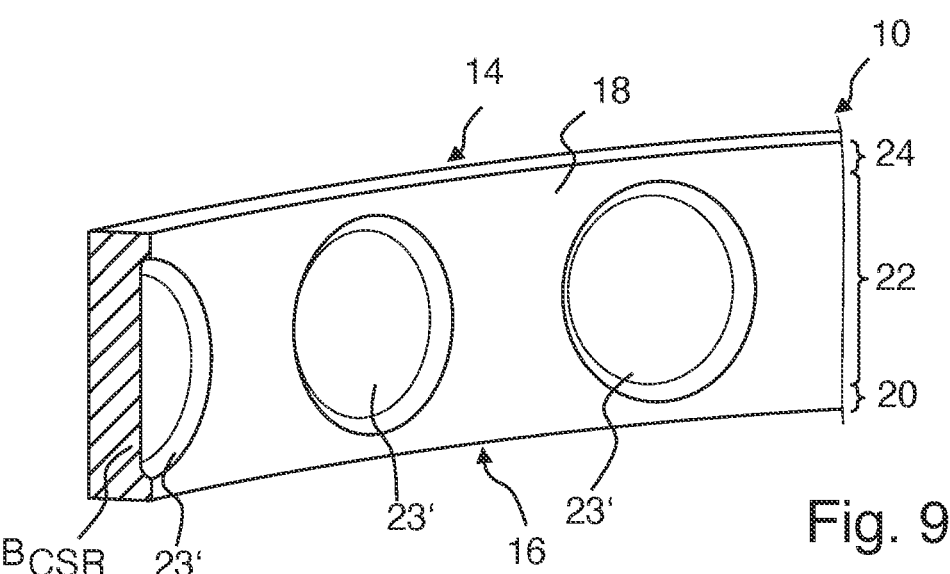
FIG. 9 schematically illustrates a cross-section of a coke scraping ring according to another embodiment in a perspective view.

FIG. 9 shows a coke scraping ring 10 in an embodiment based on the embodiment shown in FIG. 8. Where applicable, the same explanations provided in the embodiments shown in FIGS. 3-8 also apply to the embodiment shown in FIG. 9. The embodiment shown differs from the embodiment shown in FIG. 8, in that the recess elements 23' only partly protrude into the ring body 12.

FIGS. 10A-10E show various embodiments of a coke scraping ring 10 by various coke scraping ring cross-sections $B_{CSR}$. In all shown embodiments, the coke scraping ring 10 comprises a scraping ring section 20 at the bottom end 16 and a recess ring section 22, configured to provide a recess 23 in the combustion-facing side 18. All shown embodiments have the advantage that the recesses 23 are provided such that dead space in the combustion chamber is kept at a minimum while at the same time, choking is reduced to such an extent that a piston does not experience pressure-induced damage.

Figure 10A:
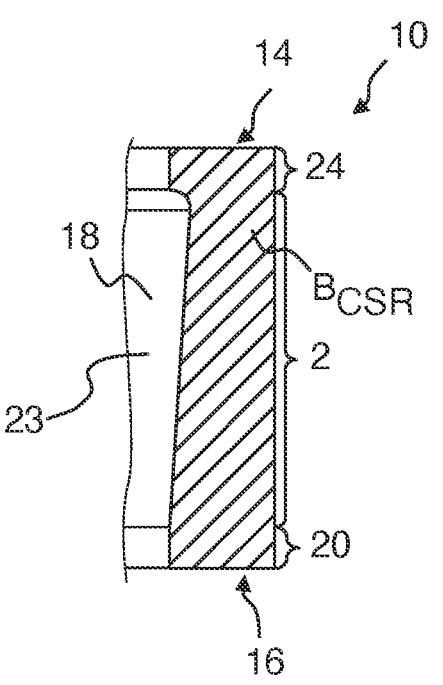
FIGS. 10A-10E each schematically illustrate a cross-section of a coke scraping ring according to further embodiments.

In the embodiment shown in FIG. 10A, the coke scraping ring 10 comprises a scraping ring section 20 and a further scraping ring section 24 at the top, each covering about 10% of the total height of the coke scraping ring 10. The recess ring section 22 has a recess 23 which is comprised by a slanted plane running from the scraping ring surface 21 to the bottom of a rounded edge, the rounded edge connecting the slanted plane with the adjacent edge of the further scraping ring section 24. The recess 23 of the recess ring section 22 may extend along the entire circumference of the combustion-facing side 18.

Figure 10B:
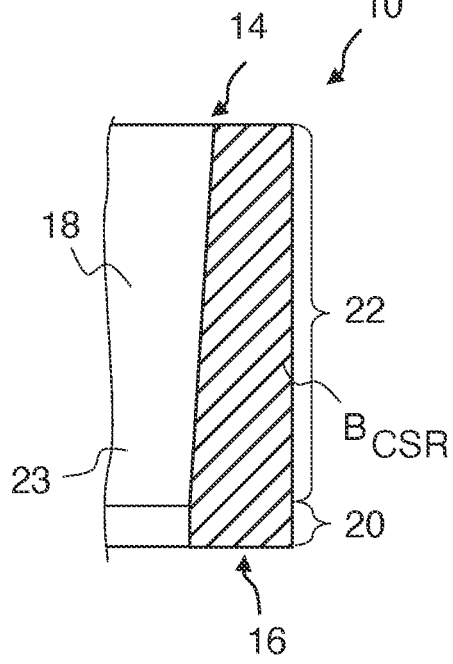

The embodiment shown in FIG. 10B is based on the embodiment shown in FIG. 10A, with the difference that no further scraping ring section is provided and that the slanted plane runs from the scraping ring surface 21 to the top end 14. The recess 23 of the recess ring section 22 may also extend along the entire circumference of the combustion-facing side 18.

Figure 10C:
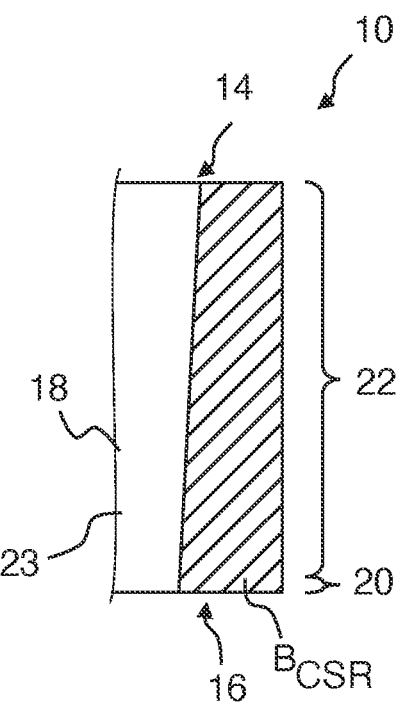

The embodiment shown in FIG. 10C is a further development of the embodiments shown in FIGS. 10A and 10B.

Here, the scraping ring section 20 is provided as a blade-like tip on the bottom end 16 of the coke scraping ring 10. The recess 23 of the recess section 22 is provided as a slanted edge running from the scraping ring section 22 in the shape of a blade-like tip to the top end 14.

Figure 10D:
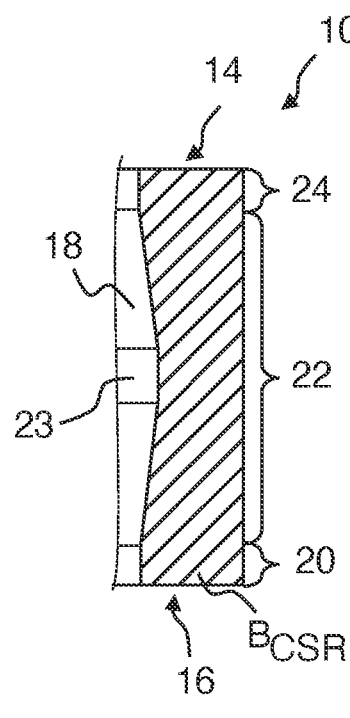

The embodiment shown in FIG. 10D comprises a scraping ring section 20 at the bottom end 16 and a further scraping ring section 24 at the top end 14. The recess 23 of the recess ring section 22 comprises a vertical recessed portion in the middle between top and bottom. The vertical recessed portion is connected by slanted planes to the adjacent edges of the scraping ring section 20 at the bottom end 16 and the further scraping ring section 24 at the top end 14, respectively.

Figure 10E:
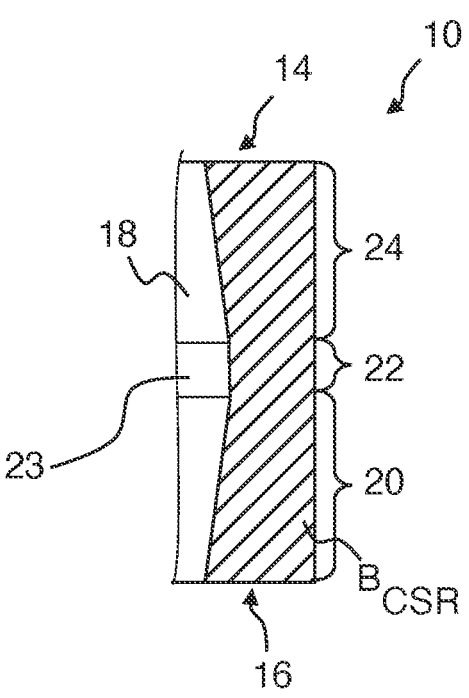

The embodiment shown in FIG. 10E is based on the embodiment shown in FIG. 10D with the difference that the slanted planes reach from the vertical recessed portion all the way to the top end and to the bottom end, respectively. In other words, the scraping ring section 20 extends from the bottom end 16 to the recessed vertical center plane and the further scraping ring section 24 extends from the top end 14 to the recessed vertical center plane.

In all embodiments shown in FIGS. 10A-10E, a widened flow path between a combustion chamber (not shown) and the scraping ring section 20 is provided. Where applicable, the same explanations provided in the embodiments shown in FIGS. 3-9 also apply to the embodiments shown in FIGS. 10A-10E.

Figure 11:
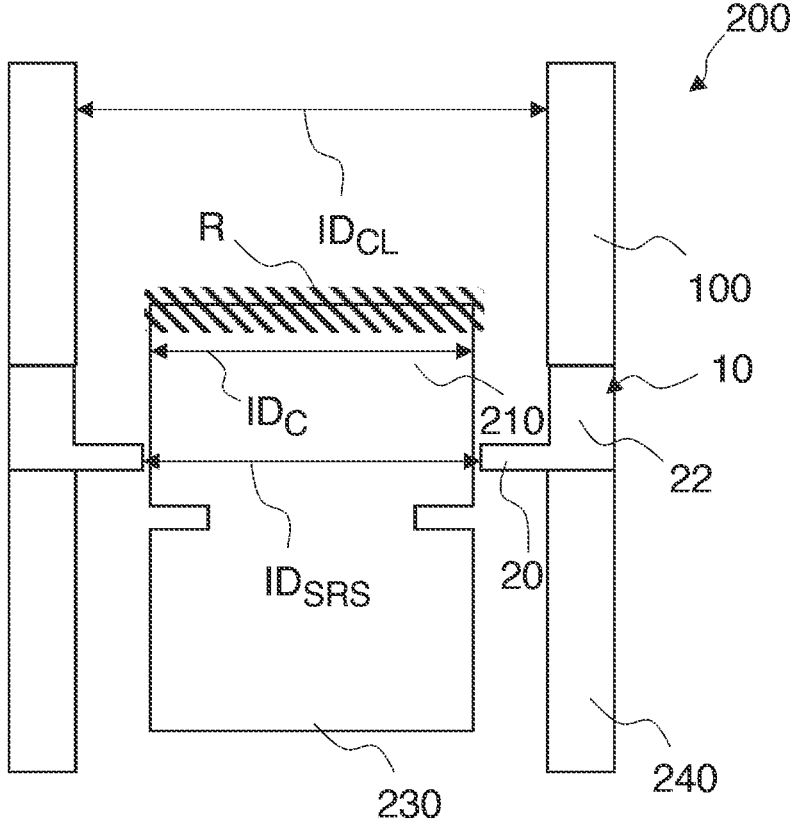
FIG. 11 schematically illustrates a cross-section of a cylinder head according to an embodiment.

FIG. 11 shows a cylinder 200 comprising a cylinder liner 100, a cylinder head 230, and a crankcase 240. The difference of a scraping ring section inner diameter $ID_{SRS}$ to a cylinder head outer diameter $I_{DC}$ may be 3 mm or less. The scraping ring section inner diameter $ID_{SRS}$ may the plane in which the scraping surface 21 lies. The cylinder head outer diameter $I_{DC}$ may be the outermost diameter of the top land of the cylinder, at which the carbonaceous residuals R accumulate. Thereby, the carbonaceous residuals R can be scraped off effectively by the scraping ring section 20 at the bottom end 16 of the coke scraping ring 10.

Further, the difference of a cylinder liner inner diameter $ID_{CL}$ to the scraping ring section inner diameter $ID_{SRS}$ may be between 0.2 mm and 1 mm.

Figure 12:
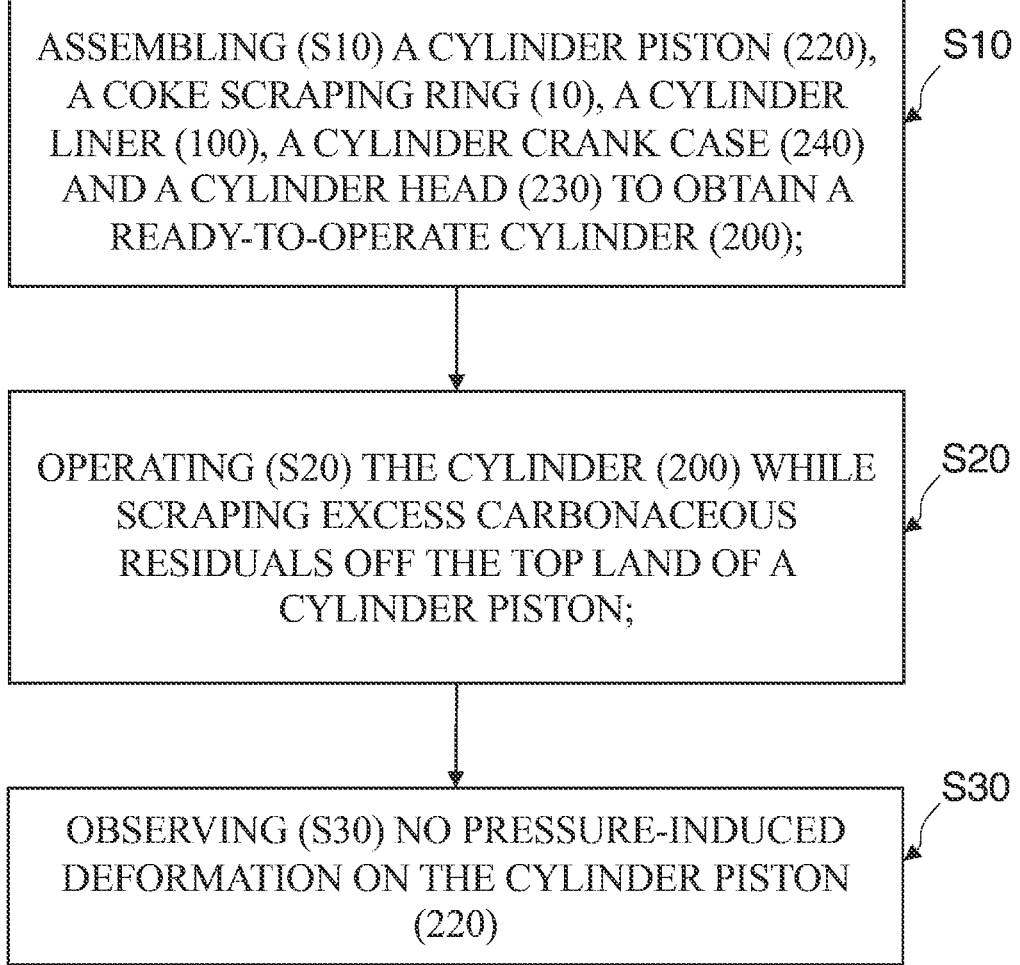
FIG. 12 illustrates a flow chart of a gas engine operation method according to an embodiment.

FIG. 12 shows a flow diagram of a gas engine operation method according to an embodiment. The method is configured for scraping carbonaceous residuals off a top land 210 of a cylinder piston 220 and comprises the steps of assembling S210 a cylinder piston 220, a coke scraping ring 10 according to the embodiments provided above, a cylinder liner 100, a cylinder crank case 240 and a cylinder head 230 to obtain a ready-to-operate cylinder 200, operating S20 the cylinder 200 while scraping excess carbonaceous residuals off the top land of a cylinder piston, and observing S30 no pressure-induced deformation on the cylinder piston. According to a further embodiment, the step observing S30 no pressure-induced deformation on the cylinder piston may comprise observing a combustion within the recess 23 or the recess elements 23' of the recess ring portion 22. Where applicable, the same explanations provided in the embodiments shown in FIGS. 3-11 also apply to the gas engine operation methods.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, a coke scraping ring may have more than one scraping ring sections. Further, the recess ring section may consist of a combination of a recess ring section variations discussed individually herein. Relevant for the teaching of the present disclosure is to provide a coke scraping ring that has a combustion-facing side which is staggered along a center axis into at least two sections, thereby allowing separation of the concerns "residual scraping" and "pressure compensation". Pressure compensation may for example be achieved by enabling sufficient fluid communication between the combustion chamber and a recess of the recess ring section, or, preferably, by enabling gas combustion within a recess of the recess ring section.

A coke scraping ring for a cylinder liner of a cylinder used in a gas engine, for scaping carbonaceous residuals off a top land of a piston may be provided. The coke scraping ring comprises a ring body, a top end, a bottom end, and a combustion-facing side configured to be in direct contact with the combustion products during operation. The coke scraping ring further comprises a scraping ring section at the bottom end and a recess ring section, configured to provide a recess in the combustion-facing side.

In the context of the present disclosure, carbonaceous residuals may be any residuals stemming from lubricant oil and/or the combustion gas itself. Said residuals may for example be ash or oil residuals, polycyclic aromatic hydrocarbons, or any other hydro-carbonaceous substance.

Further, the term "top end" relates to the end of the coke scraping ring proximal to the cylinder head. Likewise, the term "bottom end" relates to an end of the coke scraping ring distant to the cylinder head when the coke scraping ring is mounted into a cylinder. The expression configured to provide a recess in the combustion-facing side means that the volume created by the recess is an opening in the combustion-facing side. Effectively, the recess is fluidly connected to the combustion chamber.

While the scraping occurs at the bottom end of the coke scraping ring, the recess of the recess ring section inherently provides a greater clearance, or increased fluid communication, between the top end and the scraping ring section. Thereby, pressure gradients along the clearance length can be reduced, which leads to less damage on the top land of the cylinder. The reduction of pressure gradients can be achieved by enabling sufficient fluid communication and/or by enabling a gas combustion within the clearance and within the recess. The lower the pressure gradient, the less likely is pressure-induced piston deformation. In an ideal case, gas combustion takes places even in the clearance and the recess.

Thereby, a widened fluid path between a combustion chamber (not shown) and the scraping ring section is provided. This has the advantage that fluid communication may occur also in the recess of the recess ring section, such that an overpressure in the combustion chamber is reduced or avoided. In an extreme case, the fluid communication can be sufficient to allow combustion in the recess. Thereby, no dead space is added to the combustion chamber by the recess ring section.

In a preferred embodiment, the recess of the recess ring section may extend along the entire circumference of the combustion-facing side. Thereby, a symmetric clearance between the piston and the recess ring section may be achieved. This has the benefit that pressure gradients may be equal along the circumference of the coke scraping ring, reducing the risk of local pressure peaks which might cause harm to the piston. A further advantage is that the coke scraping ring may be mounted to a cylinder liner and/or to a cylinder in any rotational orientation.

In a further embodiment, the recess ring section may extend to the top end, such that a coke scraping ring is substantially L-shaped, preferably wherein the recess ring section extends over 90% of a total height of the coke scraping ring. Thereby, a gas flow path from the combustion chamber into the recess ring section to the scraping ring section may be largely unobstructed. This has the advantage that pressure compensation between the combustion chamber and the clearance between the piston and the recess ring section occurs quickly. Local pressure peaks and associated pressure-induced piston damage may be avoided therewith.

In an alternative embodiment, the recess ring section may extend between the scraping ring section at the bottom end and a further scraping ring section at the top end, such that a coke scraping ring cross-section is C-shaped, preferably wherein the recess ring section extends over 80% of a total height of the coke scraping ring.

Providing a further scraping ring section has the advantage that the coke scraping ring may be optimized such that a more uniform pressure distribution in the combustion chamber is obtained. Further, carbonaceous residuals may be scraped on two instances, allowing a more efficient scraping.

According to a preferred embodiment, the recess of the recess ring section comprises several recess elements provided on the combustion-facing side, preferably wherein the recess ring section extends over 80% of a total height of the coke scraping ring. Thereby, pressure compensation in the coke scraping ring can be optimized while reducing detrimental space. Thereby, pressure-induced damage to the piston can be minimized or avoided altogether.

According to a further development, the recess elements may be distributed evenly along the combustion-facing side. Thereby, a symmetric pressure profile across the circumference of the piston may be achieved. This way, the build-up of local pressure peaks can be minimized or avoided.

According to a further development, some or all the recess elements are provided as through-holes. Providing a recess element as a through-hole has the advantage that the flow path between a combustion chamber and the scraping ring section can be widened. This has the advantage that combustion may occur also in the recess of the recess ring section, such that an overpressure in the combustion chamber is reduced or avoided.

According to a further development, the recess elements may each comprise a cross-section consisting of a rectangle, a circle, a triangle, and/or a combination thereof. Thereby, the recess elements may be fine-tuned to specific pressure characteristics of a cylinder during operation.

According to a further development, the recess elements may have a rounded rectangular cross-section, wherein the recess elements may be oriented on the combustion-facing side in a vertical, parallel and tilted, or in a zig-zag configuration.

In this context, vertical refers to a reference scenario, in which the cylinder is vertically oriented. In this case, the longitudinal axis of each rectangular recess element is vertical. Accordingly, the expression parallel and tilted refers to a case when the longitudinal axes of the rectangular recesses are inclined by an angle such that the recess elements are provided on the combustion-facing side of the coke scraping ring as a helical profile.

This has the advantage that the flow path between a combustion chamber and the scraping ring section can be widened in a highly customized way, taking into account cylinder-specific pressure distributions.

Providing the recess elements in a parallel and tilted configuration has the advantage that a swirl may be created by the recess elements.

Since knocking events often come from the wall area of the cylinder wall, an increased swirl at this position can have a positive effect on the knock limit. The direction of the grooves could be in the main twist direction or against it.

Providing the recess elements in a zig-zag configuration has the advantage that the coke scraping ring has a symmetric design, allowing installation thereof in both orientations of the coke scraping ring. Thereby, installation is simplified, and the risk of mounting mistakes can be reduced.

According to a further embodiment, the ring body may be provided as one piece. Thereby, the structural integrity of the coke scraping ring can be maximized. Further, the resilience towards vibration, thermal expansion and shocks can be increased. Also, production and assembly of the coke scraping ring may be simplified, thereby reducing costs and the risk of coke scraping ring malfunction.

According to a further development, the scraping ring section may comprise a scraping surface which is configured to run parallel to a piston cylinder, when the coke scrape ring is in an assembled state. Thereby, the clearance between the scraping surface provides a blunt abutment towards the cylinder piston which reduces the risk of damage when the coke scraping ring contacts the cylinder piston.

According to a further development, the height of the scraping ring section may be between 1 mm and 1.5 mm. By that, the scraping ring section may be reduced to a scraping blade. Thereby, the scraping efficiency may be increased.

According to a further development, the coke scraping ring may comprise cast iron and/or steel. Thereby, a temperature and pressure resistant coke scraping ring may be provided. Cast iron may have the advantage that it can be easily manufactured at low cost. Steel may have the advantage that it exerts general and local corrosion resistances in the cylinder and inhibits formation of corrosion products when exposed to carbonaceous residuals at high temperature.

A cylinder liner may be provided, comprising a coke scraping ring. This has the advantage that combustion may occur also in the recess of the recess ring section, such that an overpressure in the combustion chamber is reduced or avoided.

In a preferred embodiment, the difference of a cylinder liner inner diameter to a scraping ring section inner diameter is between 0.2 mm and 1 mm. Thereby, a sufficient scraping efficiency can be achieved and at the same time, a large enough recess may be provided, such that an overpressure in the combustion chamber is reduced or avoided.

A cylinder may be provided, comprising a cylinder liner according to the embodiments provided above, a cylinder head and a crankcase, preferably wherein the difference of a scraping ring section inner diameter to a cylinder head outer diameter is 3 mm or less.

The scraping ring section inner diameter may the plane in which the scraping surface lies. The cylinder head outer diameter may be the outermost diameter of the top land of the cylinder, at which the carbonaceous residuals accumulate. Thereby, the carbonaceous residuals can be scraped off effectively by the scraping ring section at the bottom end of the coke scraping ring.

A gas engine may be provided, comprising a cylinder according to the embodiment provided above.

A gas engine operation method may be provided, comprising continuous scraping carbonaceous residuals off a top land of a cylinder piston, comprising the steps of assembling a cylinder piston, a coke scraping ring according to the embodiments provided above, a cylinder liner, a cylinder crank case, and a cylinder head to obtain a ready-to-operate cylinder, operating the cylinder while scraping excess carbonaceous residuals off the top land of a cylinder piston, and observing no pressure-induced deformation on the cylinder piston. Thereby, a simple, cost-effective gas engine operation may be achieved by allowing an efficient scraping of carbonaceous residuals while providing a more homogeneous pressure distribution to prevent piston damage.

The invention claimed is:

1. A coke scraping ring for a cylinder liner of a cylinder used in a gas engine for scraping carbonaceous residuals off a top land of a piston, the coke scraping ring comprising:
  a ring body having a top end, a bottom end, and a combustion-facing side configured to be in direct contact with combustion products during operation;
  a scraping ring section of the ring body at the bottom end thereof; and
  a recess ring section of the ring body configured to provide a recess in the combustion-facing side, the recess ring section including a plurality of elongate recesses extending from the combustion-facing side radially outward into the ring body, each elongate recess having opposite ends and a length extending therebetween.

2. The coke scraping ring according to claim 1, wherein the recess of the recess ring section extends along an entire circumference of the combustion-facing side.

3. The coke scraping ring according to claim 2, wherein the recess of the recess ring section extends to the top end, such that a coke scraping ring cross-section ($B_{CSR}$) is L-shaped.

4. The coke scraping ring according to claim 2, wherein the recess of the recess ring section extends between the scraping ring section at the bottom end and a further scraping ring section at the top end, such that a coke scraping ring cross-section ($B_{CSR}$) is C-shaped.

5. The coke scraping ring according to claim 1, wherein the ring body is provided as one piece.

6. The coke scraping ring according to claim 1, wherein the scraping ring section comprises a scraping surface which is configured to run parallel to a piston cylinder, when the coke scraping ring is in an assembled state.

7. The coke scraping ring according to claim 1, wherein a height ($H_{SRS}$) of the scraping ring section is between 1 and 1.5 mm.

8. The coke scraping ring according to claim 1, wherein the ring body comprises cast iron and/or steel.

9. A cylinder liner comprising a coke scraping ring according to claim 1.

10. The cylinder liner according to claim 9, wherein a difference of a cylinder liner inner diameter ($ID_{CL}$) to a scraping ring section inner diameter ($ID_{SRS}$) is between 0.2 mm and 1 mm.

11. A cylinder comprising the cylinder liner according to claim 9, a cylinder head and a crankcase, wherein a difference of a scraping ring section inner diameter ($ID_{SRS}$) to a cylinder head outer diameter ($OD_C$) is 3 mm or less.

12. A gas engine comprising a cylinder according to claim 11.

13. A coke scraping ring, for a cylinder liner of a cylinder used in a gas engine, the coke scraping ring for scraping carbonaceous residuals off a top land of a piston of the gas engine, the coke scraping ring comprising:
  a ring body having a top end, a bottom end, and a combustion-facing side configured to be in direct contact with combustion products during operation;
  a scraping ring section at the bottom end and a recess ring section, the recess ring section configured to provide a recess in the combustion-facing side;
  recess elements partly or fully protruding into the ring body; and
  wherein the recess elements have a rounded rectangular cross-section, wherein the recess elements are oriented on the combustion-facing side in a vertical, parallel and tilted, or in a zig-zag configuration.

14. A gas engine operation method comprising continuous scraping carbonaceous residuals off a top land of a cylinder piston, the method comprising:
  assembling a cylinder piston, a coke scraping ring, a cylinder liner, a cylinder crank case and a cylinder head to obtain a ready-to-operate cylinder;
    wherein the coke scraping ring comprises:
    a ring body having a top end, a bottom end, and a combustion-facing side configured to be in direct contact with combustion products during operation;
    a scraping ring section at the bottom end and a recess ring section, the recess ring section configured to provide a recess in the combustion-facing side;
  operating the cylinder while scraping excess carbonaceous residuals off the top land of a cylinder piston; and
  observing no pressure-induced deformation on the cylinder piston.

* * * * *